United States Patent [19]
Yonge, III

[11] Patent Number: 6,111,919
[45] Date of Patent: Aug. 29, 2000

[54] SYNCHRONIZATION OF OFDM SIGNALS

[75] Inventor: Lawrence W. Yonge, III, Ocala, Fla.

[73] Assignee: Intellon Corporation, Ocala, Fla.

[21] Appl. No.: 09/234,289

[22] Filed: Jan. 20, 1999

[51] Int. Cl.[7] .............................. H04K 1/10; H04L 27/28
[52] U.S. Cl. ......................... 375/260; 375/362; 375/371;
370/208; 370/210; 370/343; 370/480; 370/503
[58] Field of Search .................................... 370/203, 206,
370/208, 210, 343, 480, 503; 375/260,
362, 371, 343

[56] References Cited

U.S. PATENT DOCUMENTS

| | | | |
|---|---|---|---|
| 4,438,511 | 3/1984 | Baran | 370/19 |
| 5,282,222 | 1/1994 | Fattouche et al. | 375/1 |
| 5,444,697 | 8/1995 | Leung et al. | 370/19 |
| 5,450,456 | 9/1995 | Mueller | 375/224 |
| 5,471,464 | 11/1995 | Ikeda | 370/19 |
| 5,488,632 | 1/1996 | Mason et al. | 375/260 |
| 5,506,836 | 4/1996 | Ikeda et al. | 370/19 |
| 5,550,812 | 8/1996 | Philips | 370/19 |
| 5,555,268 | 9/1996 | Fattouche et al. | 375/206 |
| 5,559,833 | 9/1996 | Hayet | 375/259 |
| 5,596,582 | 1/1997 | Sato et al. | 370/509 |
| 5,596,604 | 1/1997 | Cioffi et al. | 345/260 |
| 5,602,835 | 2/1997 | Seki et al. | 370/206 |
| 5,608,764 | 3/1997 | Sugita et al. | 375/344 |
| 5,610,908 | 3/1997 | Shelswell et al. | 370/210 |
| 5,627,863 | 5/1997 | Aslanis et al. | 375/357 |
| 5,636,224 | 6/1997 | Voith et al. | 371/2.1 |
| 5,652,772 | 7/1997 | Isaksson et al. | 375/367 |
| 5,682,376 | 10/1997 | Hayashino et al. | 370/206 |
| 5,694,389 | 12/1997 | Seki et al. | 370/208 |
| 5,726,973 | 3/1998 | Isaksson | 370/203 |
| 5,732,113 | 3/1998 | Schmidl et al. | 375/355 |
| 5,774,450 | 6/1998 | Harada et al. | 370/206 |
| 5,802,044 | 9/1998 | Baum et al. | 370/330 |
| 5,802,117 | 9/1998 | Ghosh | 375/344 |
| 5,812,523 | 9/1998 | Isaksson et al. | 370/208 |
| 5,828,650 | 10/1998 | Malkamaki et al. | 370/203 |
| 5,889,759 | 3/1999 | McGibney | 370/207 |
| 5,901,180 | 5/1999 | Aslanis et al. | 375/261 |
| 5,914,931 | 6/1999 | Kang et al. | 370/203 |
| 5,956,318 | 9/1999 | Saeki | 370/206 |
| 5,991,289 | 11/1999 | Huang et al. | 370/350 |

OTHER PUBLICATIONS

Edfors et al., "An introduction to orthogonal frequency–division multiplexing," (Sep. 1996).

Sandell et al., "Timing and Frequency Synchronization in OFDM Systems Using the Cyclic Prefix," Div. of Signal Processing, Lulea Univ. of Tech., S–971 87, Lulea, Sweden (no date).

Schmidl et al., "Robust Frequency and Timing Synchronization for OFDM," IEEE Trans. on Communication, vol. 45, No. 12, pp. 1613–1621 (Dec. 1997).

Synchronization Bursts—Chapter 4, http:\\www.sce.carleton.ca/~Laszlo.Hazy/OFDM/bursts.html (Sep. 23, 1998).

van der Beek et al., "Low–Complex Frame Synchronization in OFDM Systems," Div. of Signal Processing, Lulea Univ. of Technology, S–971 87, Lulea, Sweden (1995).

van der Beek et al., "On Synchronization in OFDM Systems Using the Cyclic Prefix," Div. of Signal Processing, Lulea Univ. of Technology, S–971 87, Lulea, Sweden (no date).

*Primary Examiner*—Don N. Vo
*Attorney, Agent, or Firm*—Fish & Richardson P.C.

[57] ABSTRACT

A method is described for temporally aligning a received symbol that is transmitted via orthogonal channels, e.g., OFDM channels, with a reference symbol and/or an earlier received symbol. The method includes computing phases of the first symbol for the orthogonal transmission channels and comparing the computed phases of the first symbol with phases of the reference. The phases of the first symbol are successively displaced by a predetermined phase shift which depends on the channel frequency to obtain a correlation result. The temporal alignment is determined by detecting a correlation maximum based on the correlation result and used to synchronize the first symbol with the reference. The reference can also be an earlier received symbol to provide autocorrelation. The received symbols can be processed by applying a window function, e.g. a Hanning, Hamming or Blackman window. Phase correlation provides reliable time synchronization in the presence of jammers emitting narrowband signals in excess of 32 dB above the signal level.

19 Claims, 17 Drawing Sheets

SYNCHRONIZATION OF OFDM SIGNALS

BACKGROUND OF THE INVENTION

The invention relates to broadband transmission of information. More specifically, the invention relates to time synchronization of a received OFDM signal with a reference.

Orthogonal Frequency Division Multiplexing (OFDM) is a spread spectrum technology wherein the available bandwidth is subdivided into a number of discrete channels or subcarriers that are overlapping and orthogonal to each other. Each channel has a well defined frequency. Data are transmitted in the form of symbols that encompass the subcarrier frequencies. The amplitude and/or phase of the subcarriers represents the encoded information. Before a received OFDM symbol can be decoded, frequency and time synchronization of the signal have to be determined. This process is referred to as synchronization.

In OFDM transmission across power lines, the frequencies are low and crystals that provide good frequency control and stability are readily available. Frequency synchronization, however, may become more difficult at higher frequencies, e.g., in radio transmission.

Time synchronization of the received OFDM signals is more difficult to achieve, in particular in the presence of narrow band interference in the OFDM channels.

OFDM signals are typically synchronized using a time domain correlator, i.e. a correlator operating in the time domain. An OFDM transmitter and a corresponding OFDM receiver typically operate at identical and stable subcarrier frequencies, but the clock cycle defining the symbol times in the transmitter and receiver may be offset with respect to each other by a certain symbol time offset. Time synchronization between the transmitter and receiver clock cycles is accomplished by determining this offset. Typically, the receiver monitors the OFDM transmission channels for a predetermined synchronization symbol. Once the offset is established, all subsequently received symbols are shifted by the amount of the so determined offset and thereby aligned.

In one approach known in the art, the time domain correlator computes cross-correlation values between a stored temporal symbol pattern and a received temporal symbol by shifting the stored symbol pattern in small time steps relative to the received symbol until a maximum correlation value is found. The subsequently received OFDM symbols are then shifted in time by the total time shift that produced the initial alignment between the received symbol and the stored or reference symbol. This method, however, requires computation of a large number of digitized values of the received symbol. Correlation is also difficult to establish if the received signal is corrupted by narrowband interference.

In another approach known in the art, a received symbol is incrementally time-shifted in small time steps over the time duration of the reference symbol. At each time shift, the received symbol is Fourier-transformed (FFT) into the frequency domain. A cross-correlation is carried out in the frequency domain, wherein a correlation maximum is obtained when the FFT operation is performed at exactly the correct time shift. This method has the disadvantage that a large number of FFT operations have to be performed before phase correlation (time synchronization) can be established.

SUMMARY OF THE INVENTION

The invention features a frequency domain synchronization, in which the phases of the subcarriers are displaced relative to the phases of a reference until correlation is achieved, and temporal alignment is determined from the amount of phase displacement required to achieve correlation.

In general, the invention features determining phases of a first received symbol for the orthogonal transmission channels; comparing the phases of the first symbol with phases of a reference to determine a correlation between the phases of the first symbol and the phases of the reference; displacing the phases of the first symbol relative to the phases of the reference by a phase displacement and repeating the comparing; choosing a phase displacement based on the correlation between the phases of the first symbol and the phases of the reference; and determining the temporal alignment from the chosen phase displacement.

Embodiments of the invention may include one or more of the following features. The plurality of channels may be OFDM channels. Determining the phases may include determining the spectral content of the first symbol, preferably by performing a Fourier-transform. The predetermined phase shift may depend on the frequency of the transmission channel and may preferably be proportional to the frequency of the transmission channel. The phases of the reference may be stored in a memory. The reference may be a symbol that was received prior to receiving the first symbol. Transmission channels which exhibit temporal variations exceeding a predefined fluctuation value may be excluded from the phase comparison. The correlation result may be formed by computing absolute differences between the phases of the first symbol and the reference for the orthogonal channels and adding the absolute differences to obtain an error signal. The temporal alignment computed for the first symbol may be used to synchronize at least one symbol following the first symbol. The chosen phase displacement may be that which maximizes the correlation between the phases of the first symbol and the phases of the reference.

The received phases may be computed by applying a window function. The window function may be a rectangular window or an apodizing window function, such as a Gaussian, Hanning, Hamming, Blackman and Kaiser-Bessel window. The window function may be applied to the first symbol either before or after the spectral content of the first symbol is determined.

Further features and advantages of the present invention will be apparent from the following description of preferred embodiments and from the claims.

DETAILED DESCRIPTION OF THE DRAWINGS

DETAILED DESCRIPTION

In OFDM transmission, data are transmitted in the form of symbols. Each symbol has a predetermined time duration or symbol time $T_s$. Each symbol is comprised of N sinusoidal waveforms that are orthogonal to each other and form the OFDM channels or subcarriers. Each subcarrier has a frequency $f_i$ and a phase $\Phi_i$ measured from the beginning of the symbol. Orthogonality of the subcarriers requires that a whole number of periods of each waveform are contained within the symbol time $T_s$. The phases $\Phi_i$ of the waveforms can be set arbitrarily without affecting the orthogonality of the waveforms. The OFDM subcarriers occupy a frequency range between frequencies $f_1$, and $f_N$ referred to as OFDM bandwidth. Each subcarrier frequency $f_i$ has a uniform frequency spacing $\Delta f$ from the adjacent subcarrier frequency $f_{i\pm1}$. $\Delta f$ is inversely proportional to the symbol time $T_s$. Typically, the amplitude $A_i$, i.e., the signal power, in each channel is selected to be uniform.

Figure 1:
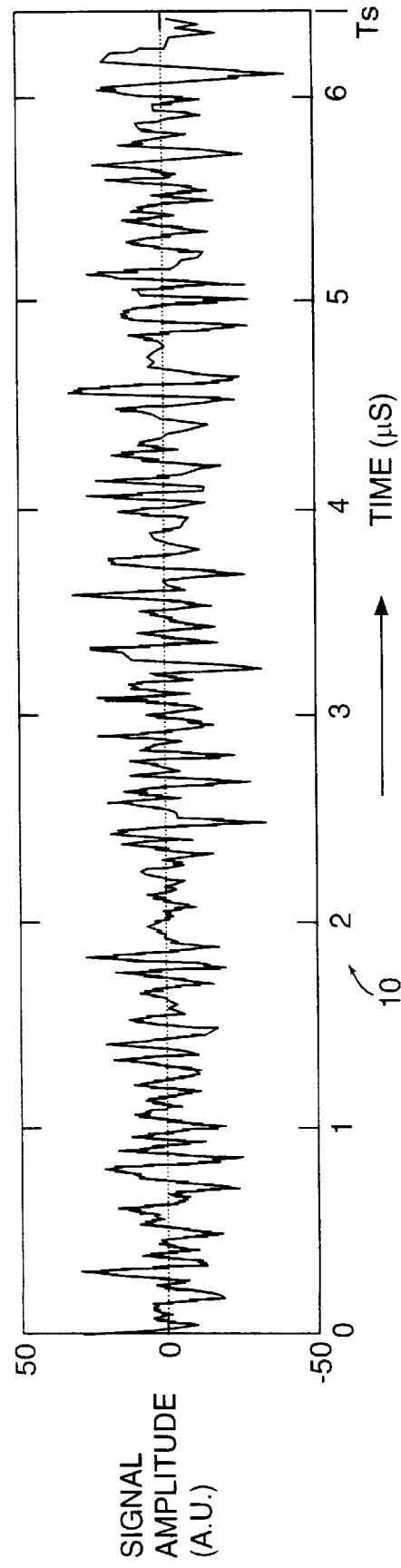
FIG. 1 is a temporal OFDM symbol.
Figure 2:
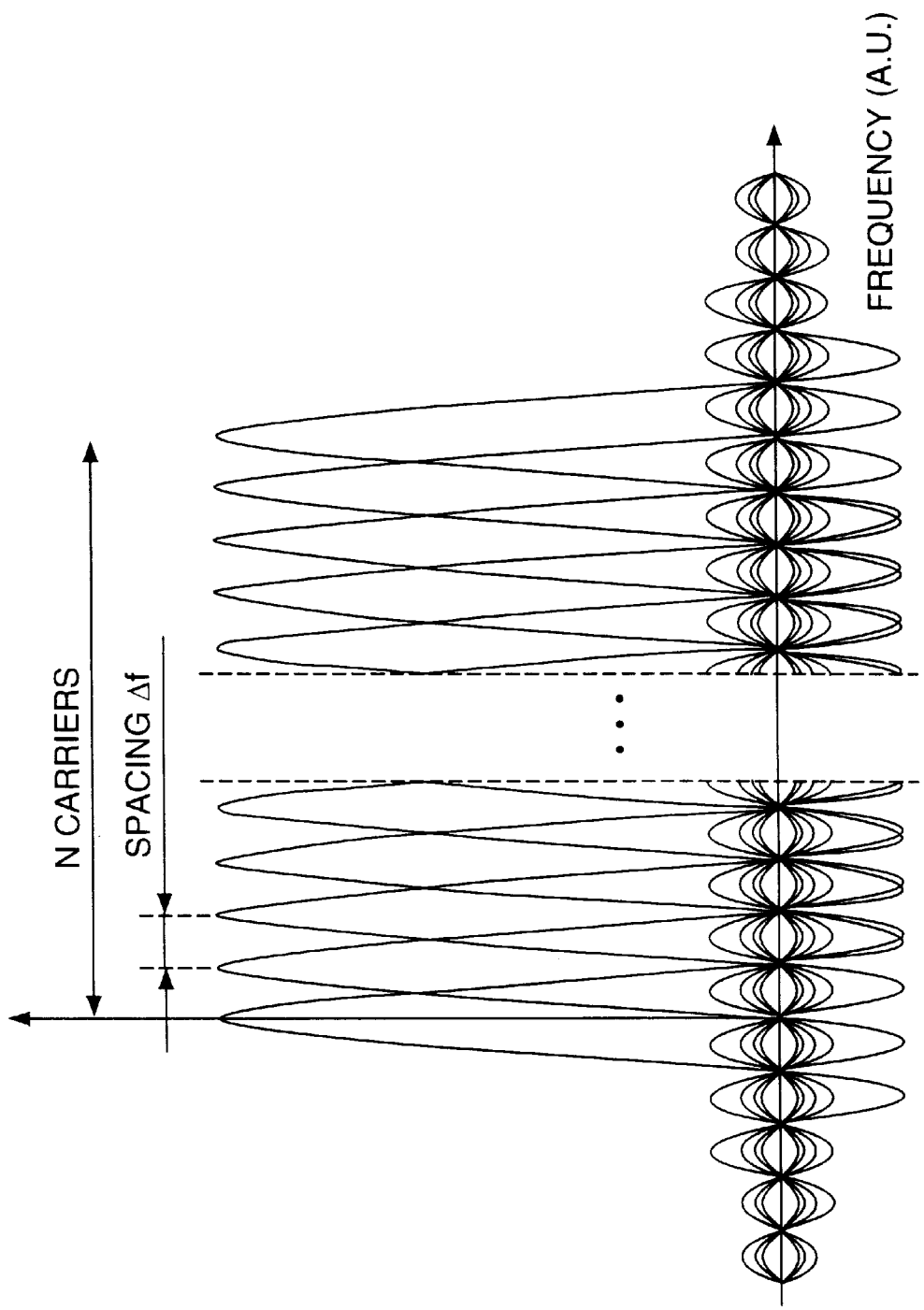
FIG. 2 illustrates symbolically a frequency distribution of OFDM channels.

Referring now to FIGS. 1 and 2, an exemplary OFDM symbol 10 has a symbol time $T_s$ of 6.4 µs, which produces a channel spacing $\Delta f=1/6.4$ µs=156.25 kHz. The symbol includes N=84 subcarrier frequencies that are uniformly spaced between a first subcarrier frequency $f_1=3.594$ MHz and a last subcarrier frequency of $f_N=16.563$ MHz, corresponding to a system bandwidth of 13.125 MHz. In the example of FIG. 1, the phases of the 84 subcarriers are selected to be random and independent of each other. However, any other set of phases may be selected without affecting the scope of the invention. For the purpose of digital signal processing, the symbol is sampled during the symbol time $T_s$ at 256 sample points at a clock rate of 40 MHz. As mentioned above, the unmodulated amplitudes $A_i$ of each of the 84 OFDM channels are identical.

OFDM channels may experience interference noise. Such noise can arise from two sources: Random noise wherein the noise energy is randomly distributed in both the time and frequency domain; and narrowband noise generated, for example, by a jammer emitting a narrowband signal at one or several frequencies that are localized within the frequency range of the OFDM channels.

Figure 3:
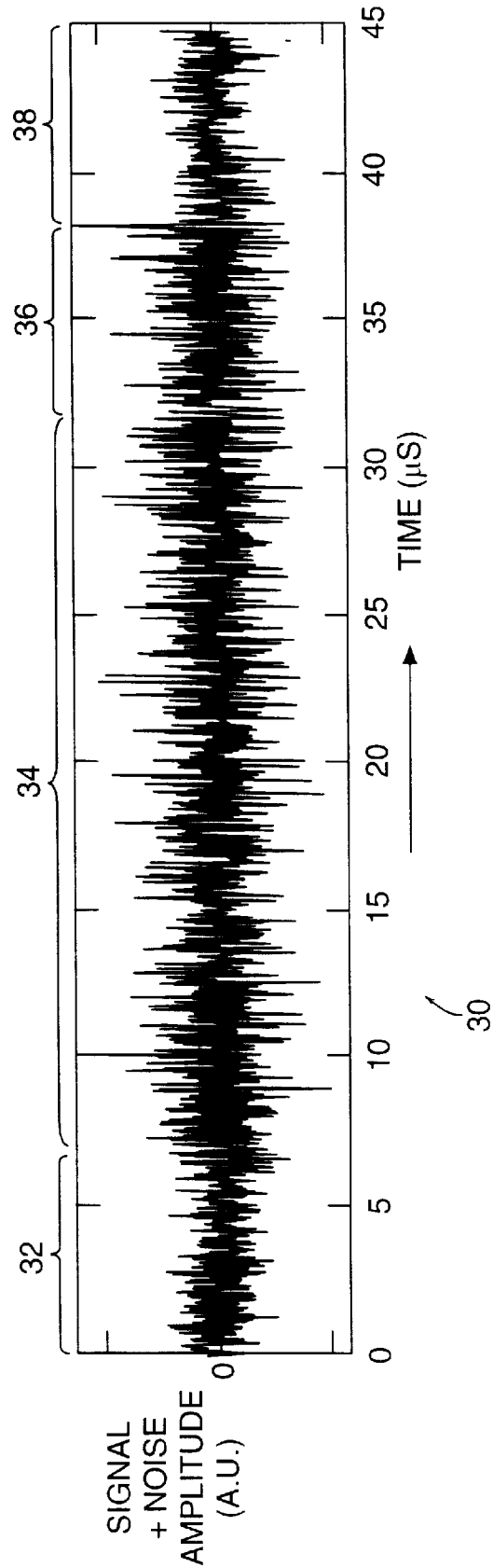
FIG. 3 is a sequence of OFDM symbols with superimposed random noise.

Referring now to FIG. 3, an exemplary temporal signal waveform 30 is composed of seven consecutive symbols, each having a duration of $T_s=6.4$ µs. Added to the symbols is random noise with a signal to noise ratio of 4.1 dB. The first symbol 32 is a "dummy" symbol having a zero signal amplitude. The first symbol 32 is followed by waveform 34 including four consecutive symbols 10 of FIG. 1. The fifth symbol 36 has also the form of symbol 10, except that the phases of all subcarriers are inverted. The last symbol 38 is another "dummy" symbol with zero signal amplitude.

Figure 4:
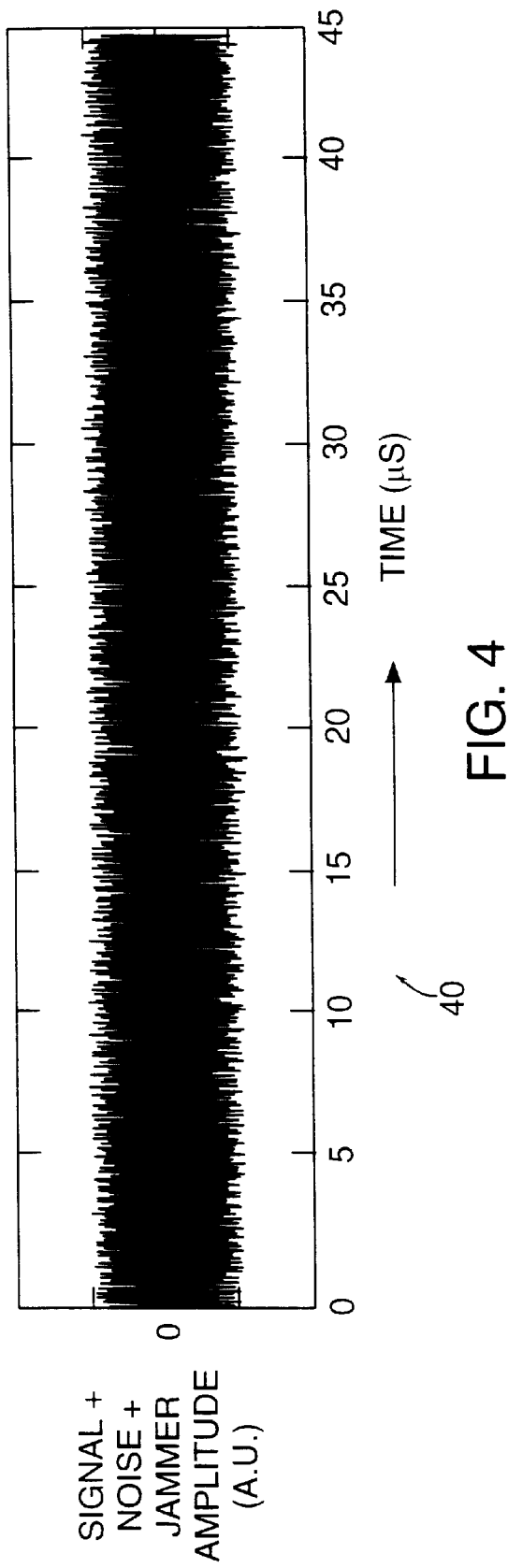
FIG. 4 is the OFDM symbol sequence of FIG. 3 with a superimposed jammer.

Referring now to FIG. 4, an exemplary jammer emitting an interfering signal at a single frequency $f_j=8.54$ MHz is added to the temporal waveform 30 of FIG. 3, producing a jammer waveform 40. In the example, the jammer-to-signal amplitude ratio is 31.7 dB, i.e., the jammer amplitude is 500 times stronger than the signal amplitude in each of the N OFDM channels. As seen in FIG. 4, the jammer completely masks the OFDM symbols 34, 36 of waveform 30.

In general, symbol data may be extracted from received OFDM waveforms having superimposed noise with a conventional time-based correlator, if the signal-to noise ratio exceeds a certain value. This is particularly true for random noise. Separating the OFDM symbols from noise, however, becomes more difficult when the noise is narrowband, i.e., confined to a specific frequency or frequency range. Correlation output signals from the time-based correlator are illustrated in FIGS. 5 to 7 and will now be described.

In general, a correlator operating in the time domain performs a correlation between two symbols. Correlation can, for example, be established between the OFDM symbol 10 and a predetermined reference symbol stored in a memory. Alternatively or in addition, correlation can be established between a received OFDM symbol 10 and another OFDM symbol 10 received at an earlier time. The second type of correlation is referred to as "autocorrelation". If the symbol 10 is received in analog form, the received analog waveform is first digitally sampled, for example, 256 times during the symbol time $T_s=6.4$ µs. The sample points are then inputted to respective registers of the time domain correlator. The correlator multiplies the sample points, if necessary after adjusting their amplitude, with 256 corresponding reference sample points that may be stored in a memory of the time domain correlator. The sample is then successively time-shifted by a time shift corresponding to the time difference between two or more sample points and another correlation is computed. The correlator produces a peak output value when the symbol is temporally aligned with the reference.

Figure 5:
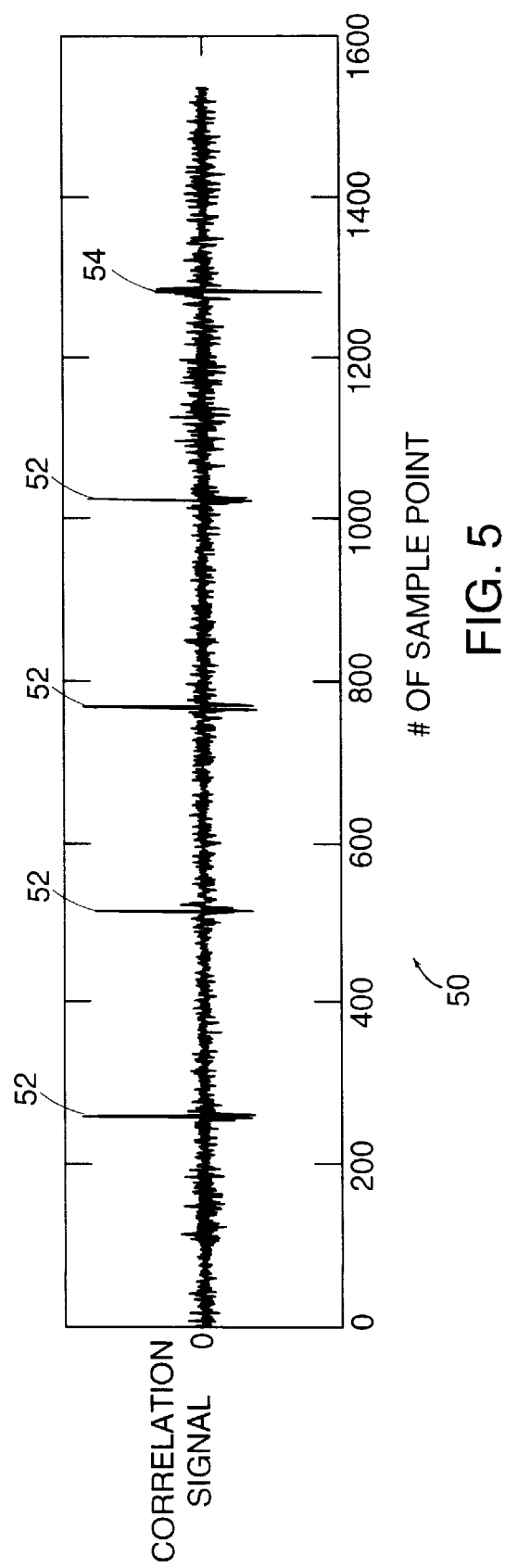
FIG. 5 is the output signal of a time domain correlator of the symbol sequence of FIG. 3.

Referring now to FIG. 5, a time domain correlator correlates the waveform 30 with a reference corresponding to symbol 10. The waveform 30 includes superimposed random noise with a signal-to-noise ratio of 4.1 dB. The output signal 50 of the time domain correlator exhibits five distinct correlation peaks 52, 54 located at the sample points 256, 512, 768, 1024 and 1280, respectively. Note that the correlation peak 54 is inverted with respect to the four preceding correlation peaks 52 because the phase of the fifth symbol 36 is inverted relative to the phase of the preceding symbols 34. The correlation peaks coincide with the beginning of sampling period which indicates that the symbols 34 are temporally aligned with the reference 10.

Figure 6:
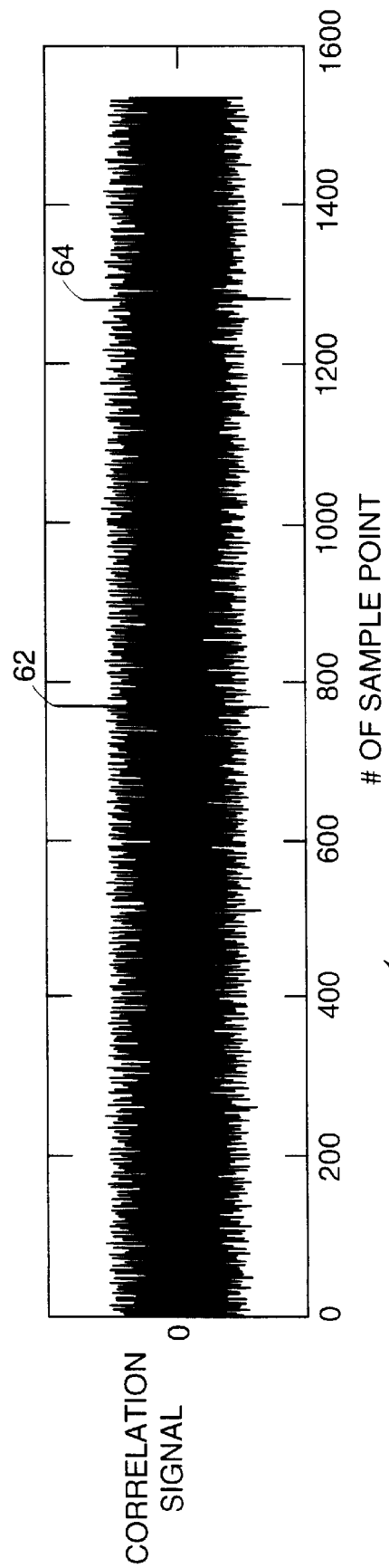
FIGS. 6 and 7 are output signals of the time domain correlator of the symbol sequence of FIG. 4 at different jammer signal levels.
Figure 7:
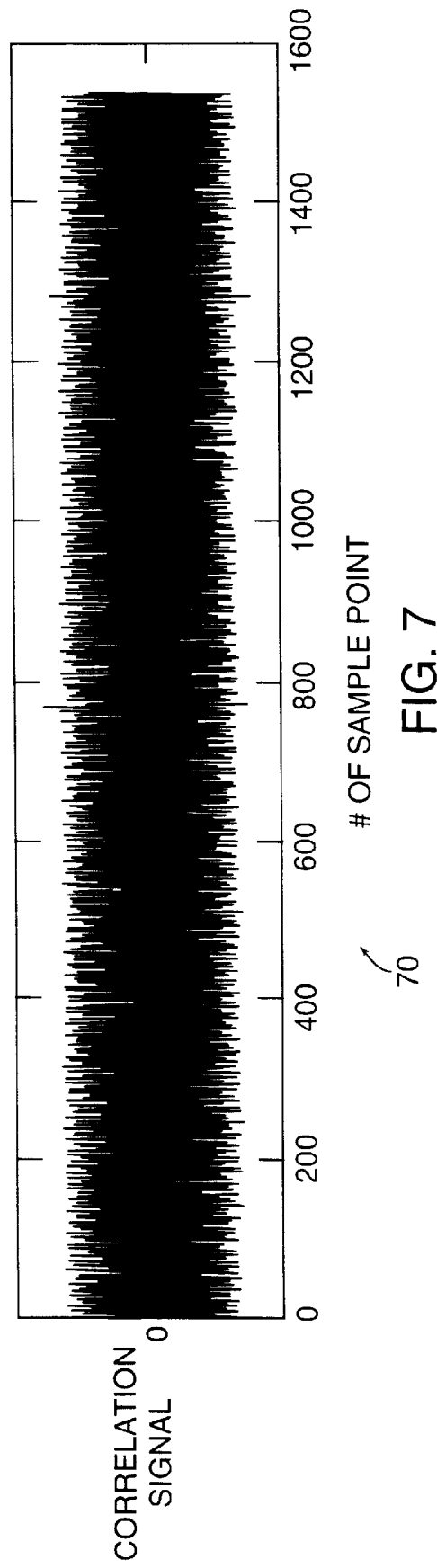

Referring now to FIG. 6, the jammer waveform 40 of FIG. 4 is applied to the signal input of the time domain correlator which then performs the same correlation as in FIG. 5. The jammer-to-signal amplitude ratio is 23.77 dB. The time domain correlator output signal 60 exhibits a peak 62 at sample point 768 and another peak 64 at sample point 1280. None of the other expected peaks are discernable. The peaks 62, 64, however, may not be reliable since none of the other expected peaks are discernable. As seen in FIG. 7, no correlation peaks are visible when the jammer-to-signal amplitude ratio increases to 31.73 dB. A time domain correlator may therefore not be able to reliably synchronize OFDM symbols even at moderate jammer signal levels. However, as will be described below, the received OFDM symbols can still be synchronized in the presence of much stronger jammer by correlation in the frequency domain.

As mentioned above, a temporal shift between two symbols corresponds to a phase shift of the OFDM subcarriers.

The phase shifts are typically proportional to the subcarrier frequencies (modulo 2π). Consequently, instead of synchronizing the OFDM symbols in the time domain, the OFDM symbols can be synchronized in the frequency domain by correlating the phases of the subcarriers with the phases of a reference symbol. Alternatively or in addition, autocorrelation can be performed by correlating the phases of a received symbol with those of an earlier received symbol. Phase correlation has several advantages: it is more robust than time domain correlation since it is significantly less affected by amplitude variations; phase correlation may also require less computations and less complex hardware.

Figure 14:
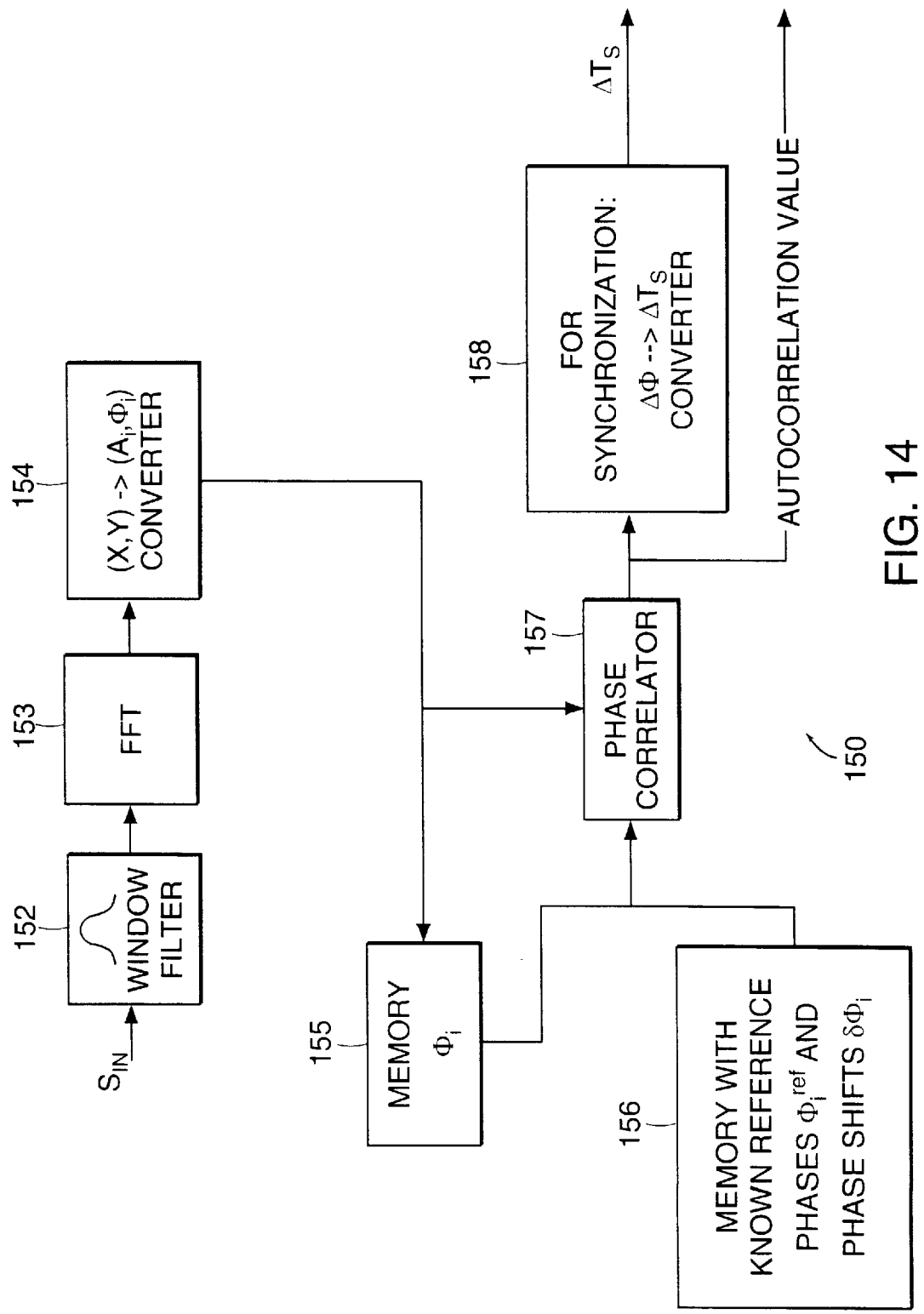
FIG. 14 is a schematic diagram of the phase correlator module of the invention.

Referring now first to FIG. 14, the temporal waveform $S_{in}$ is received by phase correlator module 150. The waveform $S_{in}$ is filtered by a window filter 152 which can be placed either before a FFT module 153, as illustrated in FIG. 14, or after the FFT module 153 (not shown). The FFT module 153 then transforms the filtered waveform to extract the information encoded on the OFDM subcarriers. Window filter 152 operates on the temporal waveform and multiplies the received waveform $S_{in}$ preferably with an apodizing filter function, e.g., a Hanning window. A window filter placed after the FFT module 153, on the other hand, operates on the OFDM subcarriers in the frequency domain. As is known from signal processing theory, a convolution in the frequency domain is equivalent to multiplication in the time domain. Typically, convolution is more computationally intensive than multiplication, and so time domain multiplication is employed. In the present case, however, since in the frequency domain the apodizing windows are quite narrow, the "windowed" amplitude in the frequency domain can be obtained by relatively simple convolution computation. E.g., for a Hanning window as the apodizing window, an accurate approximation can be achieved by subtracting for each subcarrier $f_i$ one half of the sum of the amplitudes at the two adjacent carriers, i.e., $\frac{1}{2}(f_{i+1}+f_{i+2})$. With binary numbers, this operation is equivalent to a simple addition and a shift of all bits to the right by one bit. Windowing in the frequency domain therefore eliminates the need for lookup tables. Furthermore, the window need only be applied to the subcarriers of interest, such as the channels in the vicinity of the jammer frequency. The advantages of applying an apodizing filter function will be discussed below.

Converter 154 converts the Fourier-transformed (FFT) data to polar coordinates representing the amplitudes $A_i$ and the phases $\Phi_i$ of the received symbol at the N subcarrier frequencies $f_1, \ldots, f_N$. The phases $\Phi_i$ may be stored in memory 155 for computing autocorrelation values for comparison with a symbol received at a later time.

For computing phase correlation between a received symbol and a reference, phase correlator 157 compares the phases $\Phi_i$ of the received symbol with known reference phases $\Phi_i^{ref}$ that are stored in memory 156. Phase correlator 157 adds the absolute values of the difference between the phases $\Phi_i$ and $\Phi_i^{ref}$ at the frequencies $f_i$ to produce a sum $\Sigma|\Phi_i^{ref}-\Phi_i|$. The phases $\Phi_i$ or the difference $\Phi_i^{ref}-\Phi_i$, respectively, are then successively incremented by predetermined frequency-dependent phase shifts $\delta\Phi_i$. $\delta\Phi_i$ is proportional to the subcarrier frequency $f_i$ (modulo 2π) with the following functional dependence:

$$\delta\Phi_i = \frac{2\pi * T_s * f_i}{\text{\# of sample points}}$$

Figure 15:
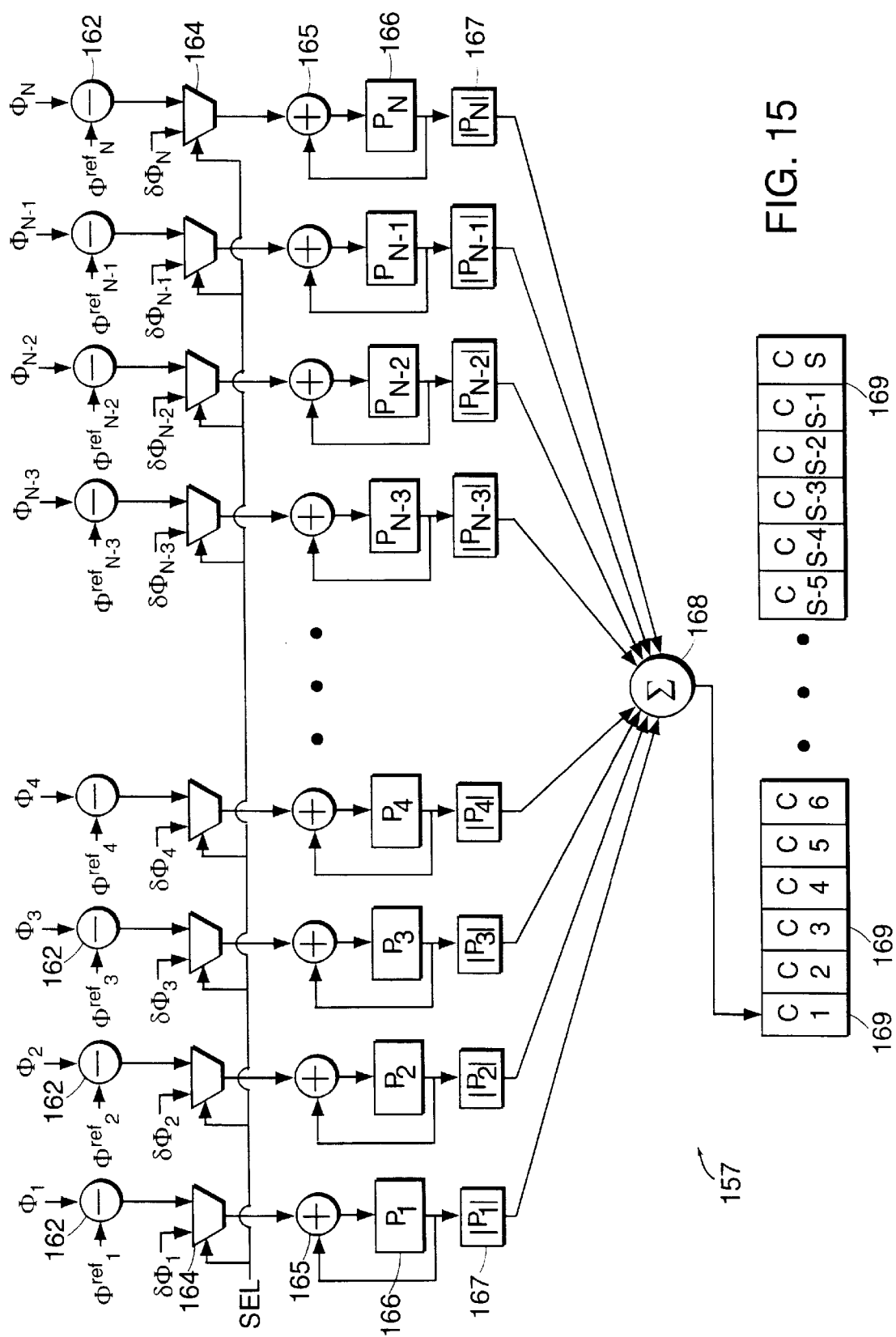
FIG. 15 is a block diagram of the phase correlator circuit of FIG. 14.

In the present example, the number of sample points is equal to 256, $T_s$=6.4 μs, $f_1$=3.594 MHz and $f_{84}$=16.563 MHz. As a result, $\delta\Phi_1$=0.565 radians and $\delta\Phi_{84}$=2.602 radians. New sums $\Sigma|\Phi_i^{ref}-\Phi_i|$ are computed for each increment in the phase shifts and stored in a memory 169 (FIG. 15). The respective sum $\Sigma|\Phi_i^{ref}-\Phi_i|$ that exceeds a predetermined maximum value or falls below a predetermined minimum value establishes phase correlation. A second converter 158 computes from the sum $\Sigma|\Phi_i^{ref}-\Phi_i|$ that produced the maximum or minimum value, a time shift $\Delta T_s$ between the received symbols of signal 30 and the known reference symbol or one of the symbols received earlier, respectively, for synchronization.

For the purpose of establishing autocorrelation between a received symbol and a symbol received at an earlier time, phase correlator compares the phases $\Phi_i$ of the received symbol with the phases $\Phi_i^{prec}$ of the preceding symbol that are stored in memory 155, and computes the respective sum $\Sigma|\Phi_i^{prec}-\Phi_i|$ which represents the autocorrelation value.

The output data produced by FFT unit 153 depend on the window filter 152 applied to the temporal waveform $S_{in}$. If the temporal waveform $S_{in}$ is composed exclusively of symbols that are periodic with the symbol time $T_s$=6.4 μs, i.e., the waveform $S_{in}$ does not contain non-periodic signals such as noise, then an FFT performed over the symbol time $T_s$=6.4 μs produces the frequency spectrum of FIG. 2. In other words, with a strictly periodic input signal, a rectangular window of the form described by Eq. (1) below and applied before the Fourier transform, preserves the orthogonality of the OFDM subcarriers and does not introduce crosstalk between OFDM channels. On the other hand, if the temporal waveform includes non-periodic components, e.g., random noise or a narrowband jammer, then a rectangular window may introduce inter-channel crosstalk by creating sidebands having a frequency spacing $\Delta f=1/T_s$. However, as seen below, phase correlation in the frequency domain with a rectangular window is still superior to conventional time domain correlation.

In a first embodiment of the invention, a rectangular window is applied before the FFT unit 153. In other words, during each time interval $T_s$ and before the FFT, each temporal sample point of input waveform $S_{in}$ is multiplied with the respective value of the window function at the sample point. The window function R(t) of the rectangular window can be written as:

$$R(t) = \begin{cases} 1, & \text{if } 0 \le t \le T_s \\ 0, & \text{otherwise} \end{cases} \qquad \text{Eq. (1)}$$

Figure 8:
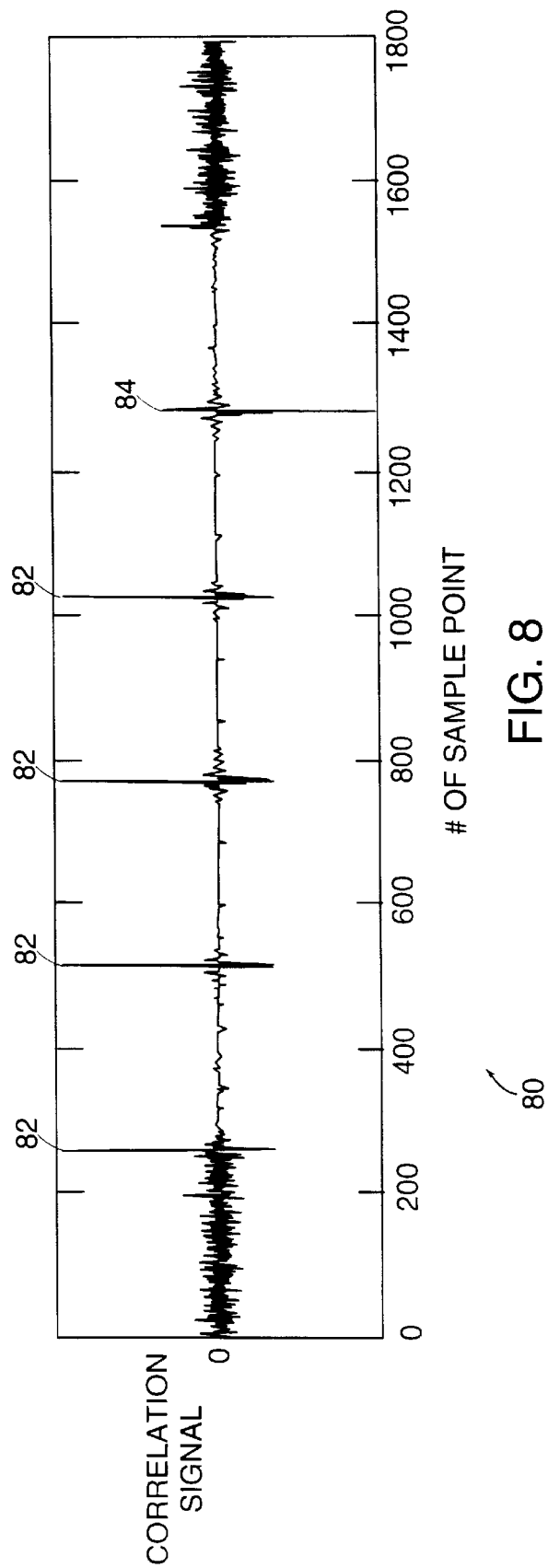
FIG. 8 is the output signal of the phase correlator of the invention with the symbol sequence of FIG. 3 and a rectangular window.

Referring now to FIG. 8, the received waveform 30 (i.e., the received signal contains only superimposed random noise) is "processed", i.e., filtered, with the rectangular window of Eq. (1). The phase correlator circuit 160 distinctly resolves the five correlation peaks 82, 84 and their temporal position corresponds exactly to that of the correlation peaks 52, 54 obtained with the time domain correlator of FIG. 5. This result demonstrates that the phase correlator performs at least as well as the time domain correlator in the presence of random noise.

Figure 9:
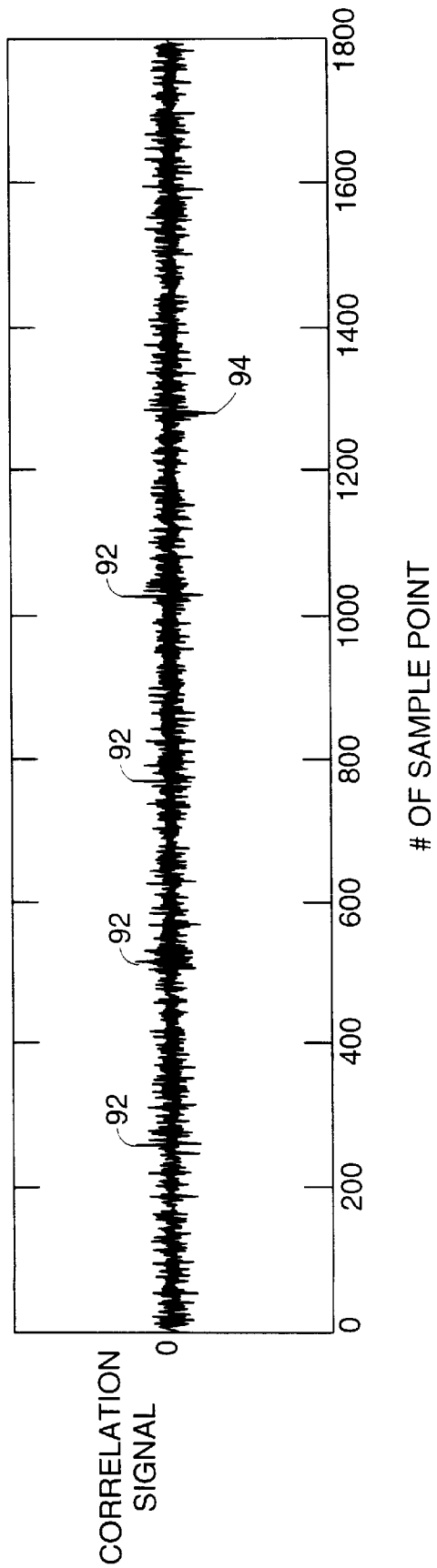
FIG. 9 is the output signal of the phase correlator of the invention with the symbol sequence of FIG. 4 and a rectangular window.

Referring now to FIG. 9, the input waveform 40 (the received signal contains both the random noise and the jammer with a jammer-to-signal amplitude ratio of 27.3 dB) is processed with the rectangular window of Eq. (1). The output 90 of the phase correlator of the invention resolves five correlation peaks 92, 94. Although the peaks are significantly weaker than those of FIG. 8, correlation can still be established. This result compares favorably with the correlation signal of FIG. 6 obtained with the time domain correlator which showed essentially no correlation at a significantly lower jammer power of 23.8 dB. Correlation with the phase correlator of the invention can be improved even further by replacing the rectangular window with an apodizing function, or apodizing window.

Figure 10:
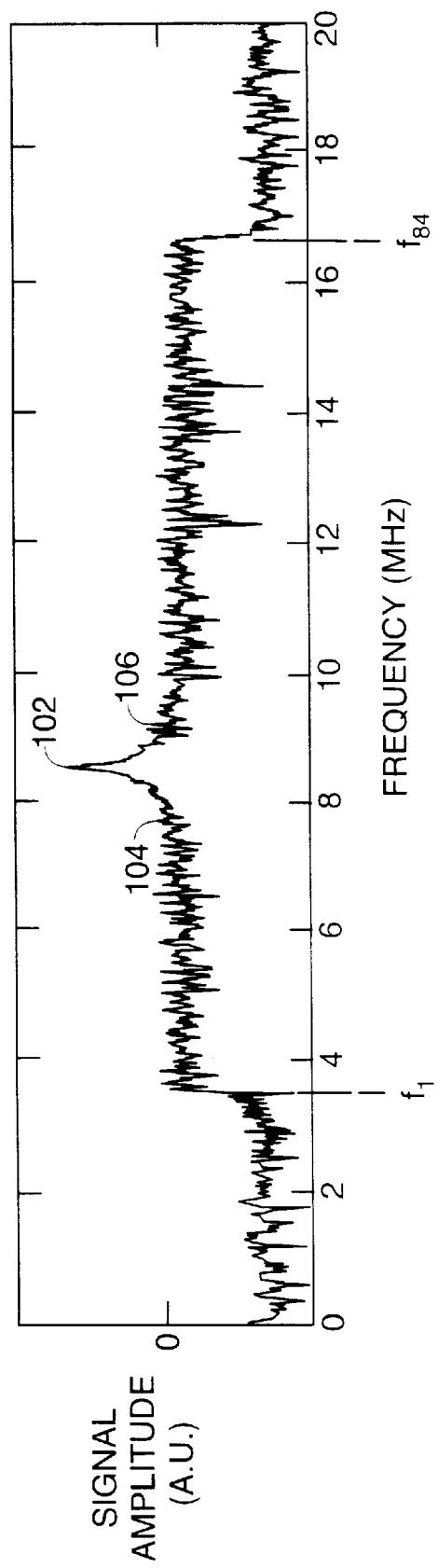
FIG. 10 is the Fourier transform of the OFDM waveform of FIG. 4 with a rectangular window.
Figure 11:
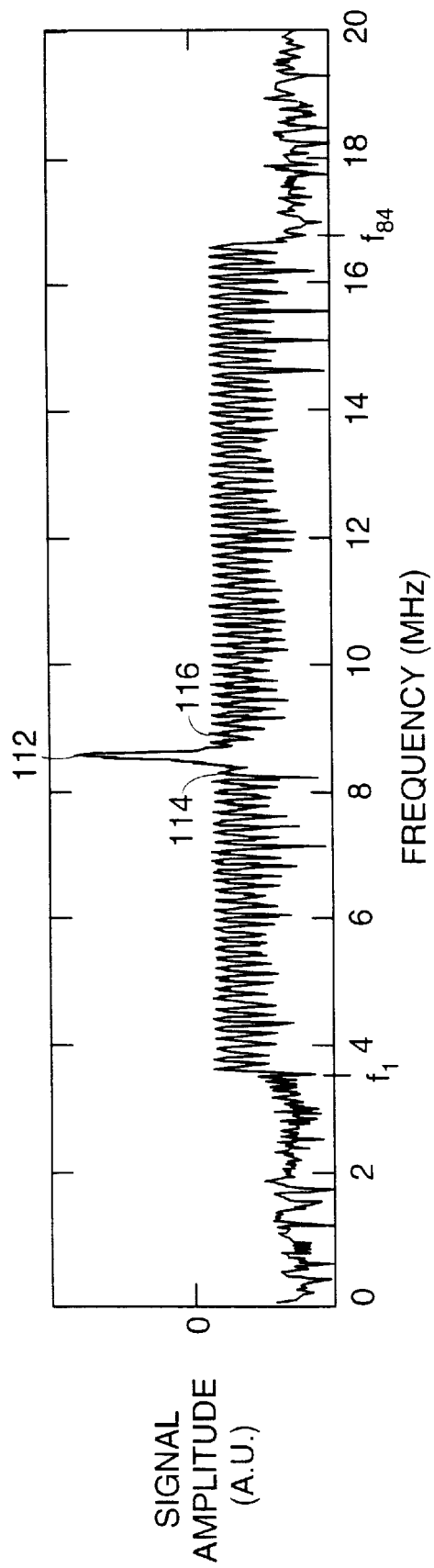
FIG. 11 is the Fourier transform of the OFDM waveform of FIG. 4 with a Hanning window.

Referring now to FIGS. 10 and 11, the benefit provided by an apodizing function can best be understood with reference to the Fourier-transforms of signal waveform 40. FIGS. 10 and 11 show the FFT output over the frequency range 0–20 MHz spanning the OFDM bandwidth between $f_1$=3.594 MHz and $f_{84}$=16.563 MHz. The jammer emits a narrowband signal at $f_j$=8.54 MHz. As seen in FIG. 4, processing the signal waveform 40 with the rectangular window of Eq. (1) produces a broad peak 102. The interfering jammer signal extends to both sides 104, 106 of the jammer's center frequency $f_j$, affecting a large percentage of the OFDM subcarriers. The affected OFDM subcarriers may have to be excluded from the phase correlation for improved performance and also from the OFDM bandwidth.

Conversely, as seen in FIG. 11, processing the received OFDM signal with the Hanning window of Eq. (2) instead of the rectangular window at the same jammer power, produces a peak 112 that is considerably narrower than the peak 102 of FIG. 10. Details of the Hanning window and other apodizing functions will be discussed below. With the Hanning window and depending on the jammer-to-signal amplitude ratio, the jammer essentially affects only a limited number of subcarriers having frequencies adjacent to the jammer frequency $f_j$. The jammer amplitude at the more distant frequencies is reduced by more than 26 dB from its peak amplitude 112. As also seen in FIG. 11, with the Hanning window, most OFDM channels, with exception of the small number of channels immediately adjacent to the jammer frequency, are clearly resolved. In other words, processing the signal waveform 40 with the Hanning window confines interference from the jammer to only several of the OFDM channels. The phase correlator employing the Hanning window therefore provides significantly improved resolution and performance over the embodiment using the rectangular window, as will now be discussed.

Figure 12:
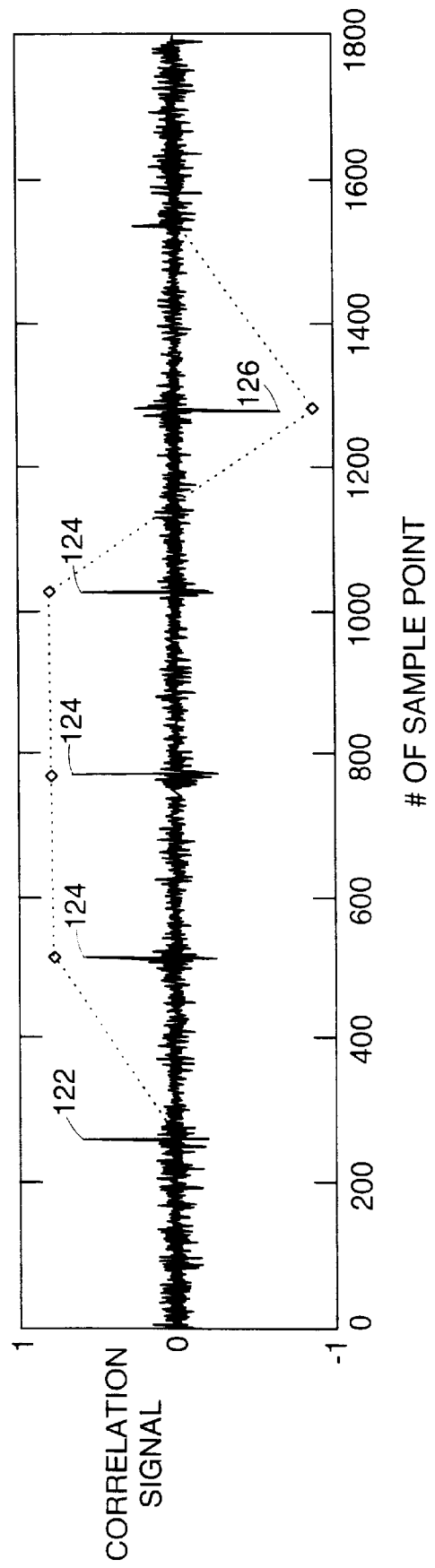
FIGS. 12 and 13 are correlation and autocorrelation peaks of the phase correlator of the invention with the symbol sequence of FIG. 4 and a Hanning window.
Figure 13:
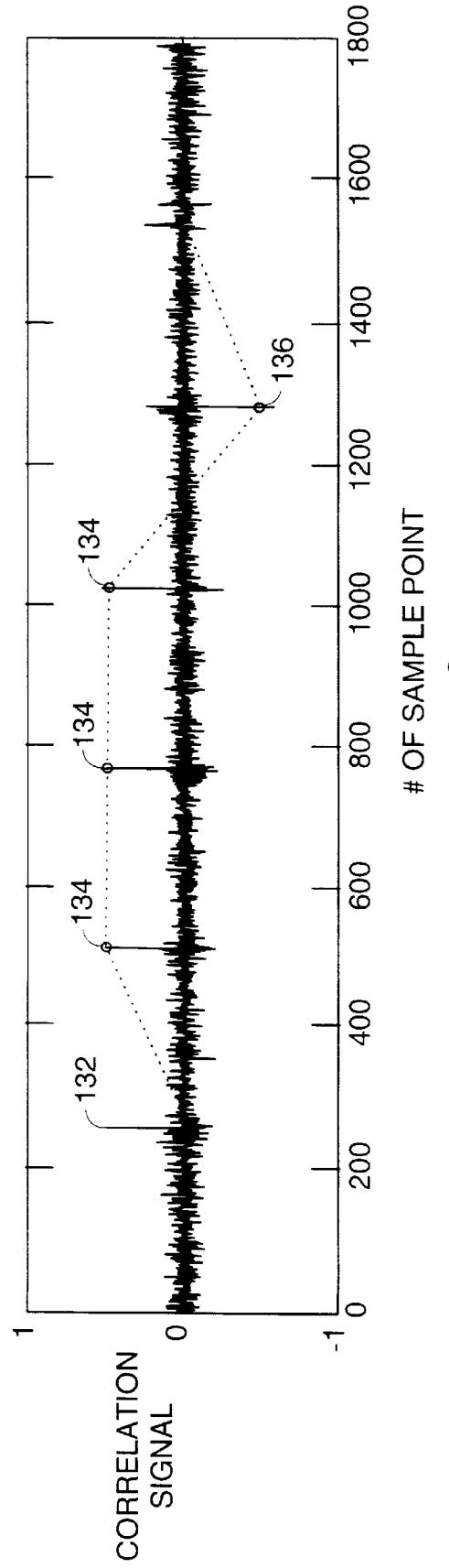

Referring now to FIGS. 12 and 13, in a second embodiment of the invention, an "apodizing" function, i.e., a function that has smoother "edges" than the rectangular window, is used as window filter 152 (FIG. 14). Apodizing functions of this type are commonly employed in signal processing applications; examples are Hanning, Hamming and Blackman and Kaiser-Bessel windows. A Hanning window can be represented by the following function:

$$HN(t) = \sin^2\left(\frac{\pi * n}{N - 1}\right) \quad \text{Eq. (2)}$$

n is the $n^{th}$ sample point out of a total of N sample point of the sampled received temporal waveform.

A Hamming window can be written as:

$$HM(t) = 0.54 - 0.46 * \cos\left(\frac{2\pi * n}{N - 1}\right) \quad \text{Eq. (3)}$$

and the Blackman window has the form:

$$B(t) = 0.42 - 0.5 * \cos\left(\frac{2\pi * n}{N - 1}\right) + 0.08 * \cos\left(\frac{4\pi * n}{N - 1}\right) \quad \text{Eq. (4)}$$

Referring now to FIG. 12, the input waveform 40 with a jammer-to-signal amplitude ratio of 27.3 dB, i.e., a jammer signal that is 300 times stronger than the signal power in each subcarrier, is processed in window filter 152 with the Hanning window of Eq. (2). Phase correlator 157 clearly resolves five correlation peaks 122, 124, 126. A comparison between the peak signal amplitudes 122, 124, 126 obtained with the Hanning window and the amplitudes 92, 94 (FIG. 9) obtained with the rectangular window demonstrates the advantages of using an apodizing filter function. As mentioned above, a time domain correlator did not produce reliable correlation at all (FIG. 6).

Referring now to FIG. 13, the input waveform 40 with a jammer-to-signal amplitude ratio of 31.3 dB, is processed in window filter 152 with the Hanning window of Eq. (2). The output peaks 132, 134, 136 in both correlation and autocorrelation are resolved, albeit with a smaller signal-to-noise ratio than that of the peaks of FIG. 12.

The dashed lines of FIGS. 12 and 13 connect the autocorrelation peak signal values. Autocorrelation represents correlation between a signal and the immediately preceding signal. No autocorrelation peak is observed at peak positions 122 of FIG. 12 and 132 of FIG. 13 since the first symbol 32 (FIG. 3) is a "dummy" symbol with zero amplitude. The autocorrelation peaks of FIG. 12 are actually stronger than the correlation peaks with the reference signal. One explanation for this result is that two received symbols are likely to contain the same artifacts caused, e.g., by inter-symbol interference, and therefore correlate better with each other than with the reference that does not contain those artifacts. In practice, the presence of symbols on OFDM transmission channels may first be established by autocorrelation. Only after the symbols have been found, are the symbols synchronized relative to the reference.

Other apodizing window function, such as the Hamming, Blackman and Kaiser-Bessel windows (not shown), produce phase correlator output peaks that are essentially identical to those obtained with the Hanning window.

Referring back to FIG. 14, phase correlator module 150 includes an window filter 152 and a FFT module 153 to transform the temporal symbol waveform into the frequency domain. First converter 154 converts the output of the FFT module 153 to respective amplitude values $A_i$ and phase values $\Phi_i$ at each of the OFDM subcarrier frequencies $f_i$. Phase correlator 157 compares the phases $\Phi_i$ to known reference phases $\Phi_i^{ref}$ that may be stored in a memory 156, or to the phases $\Phi_i$ of a symbol that was received earlier. The phases $\Phi_i$ of the earlier received symbol may be stored in a memory 155 that may be identical to memory 156. Phase correlator 157 then either compares the phases to produce an autocorrelation value or aligns the phases with the reference phases, as discussed above. A corresponding time shift $\Delta T_s$ which represents the temporal shift between the received symbols and the reference, is computed from the aligned phases and used for synchronization.

Referring now to FIG. 15, for each of the OFDM subcarriers 1, . . . , N, the phase correlator 157 includes a subtractor 162 that receives from the first converter 154 a respective symbol phase $\Phi_i$. Each subtractor 156 also receives a respective reference phase $\Phi_i^{ref}$ stored in memory 165. Instead of the reference phase $\Phi_i^{ref}$, the phase of an earlier received symbol may be inputted to subtractor 162 for computing autocorrelation. To simplify the following discussion, only correlation relative to the reference phase $\Phi_i^{ref}$ will be described. Each subtractor 162 produces a difference value $\Delta\Phi_i = \Phi_i^{ref} - \Phi_i$ that is supplied to a first input of a multiplexer 164. A second input of the multiplexer 164 receives from memory device 156 respective phase shift constants $\delta\Phi_i$ that may be different for each subcarrier i.

Depending on the logical state of select line SEL, the multiplexer 164 transfers either $\Delta\Phi_i$ or $\delta\Phi_i$ to a respective adder 165. In a first operation, each adder 165 receives the difference value $\Delta\Phi_i = \Phi_i^{ref} - \Phi_i$ and adds the difference value to register 166 which is initially set to zero. Absolute value circuit 167 computes the absolute value $|\Delta\Phi_i|$. Adder 168 adds the output values produced by the N absolute value circuits 167 to form a first correlation value $C_1$ which is stored in a first output register 169.

In the next operation, select line SEL enables each multiplexer 164 to transfer a respective phase shift constant $\delta\Phi_i$ to each of the adders 165 which then adds the respective phase shift constant $\delta\Phi_i$ to the previous (old) difference value $\Delta\Phi_i^{old}$ stored in register 166 to form a new difference value $\Delta\Phi_i^{new}$. Additions are always modulo($2\pi$), with the result between $-\pi$ and $+\pi$. Absolute value circuit 167 then computes new absolute values $|\Delta\Phi_i^{new}|$ which are added in adder 168 to form a second correlation value $C_2$ which is stored in a second output register 169. In the present example where the temporal symbol is sampled 256 times, this process also repeats 256 times until the total phase shift $\Sigma(\delta\Phi_i)$ produced by adding the phase shift constants $\delta\Phi_i$ spans the symbol time $T_s$. When all correlation value $C_k$ are computed, the maximum (or minimum) value of all correlation values $C_1, C_2, \ldots, C_{max}$ is determined and used to compute the time shift $\Delta T_s$ between the symbol and the reference for synchronization.

Figure 16A:
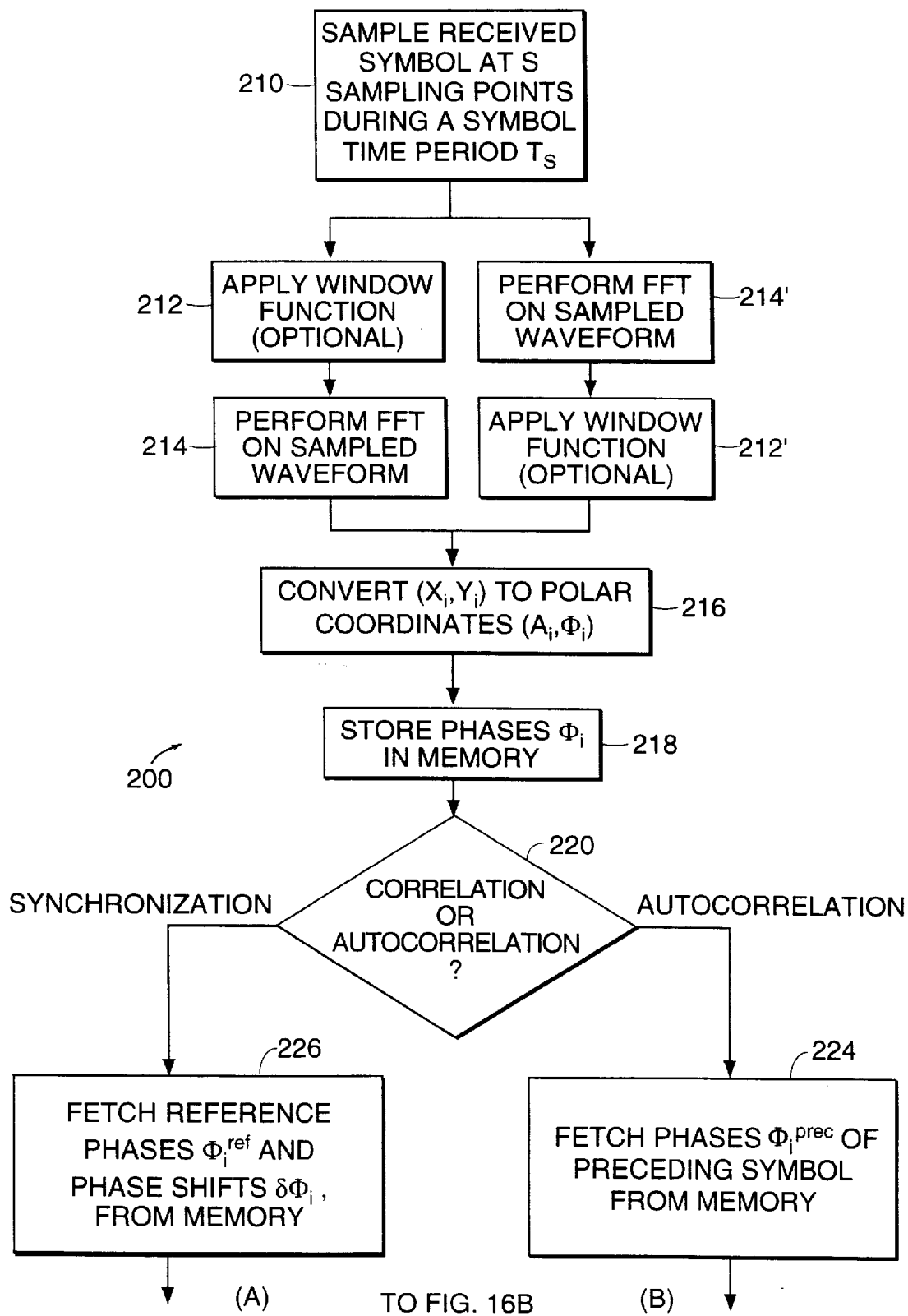
FIGS. 16A and 16B is a flowchart of the phase correlation process.
Figure 16B:
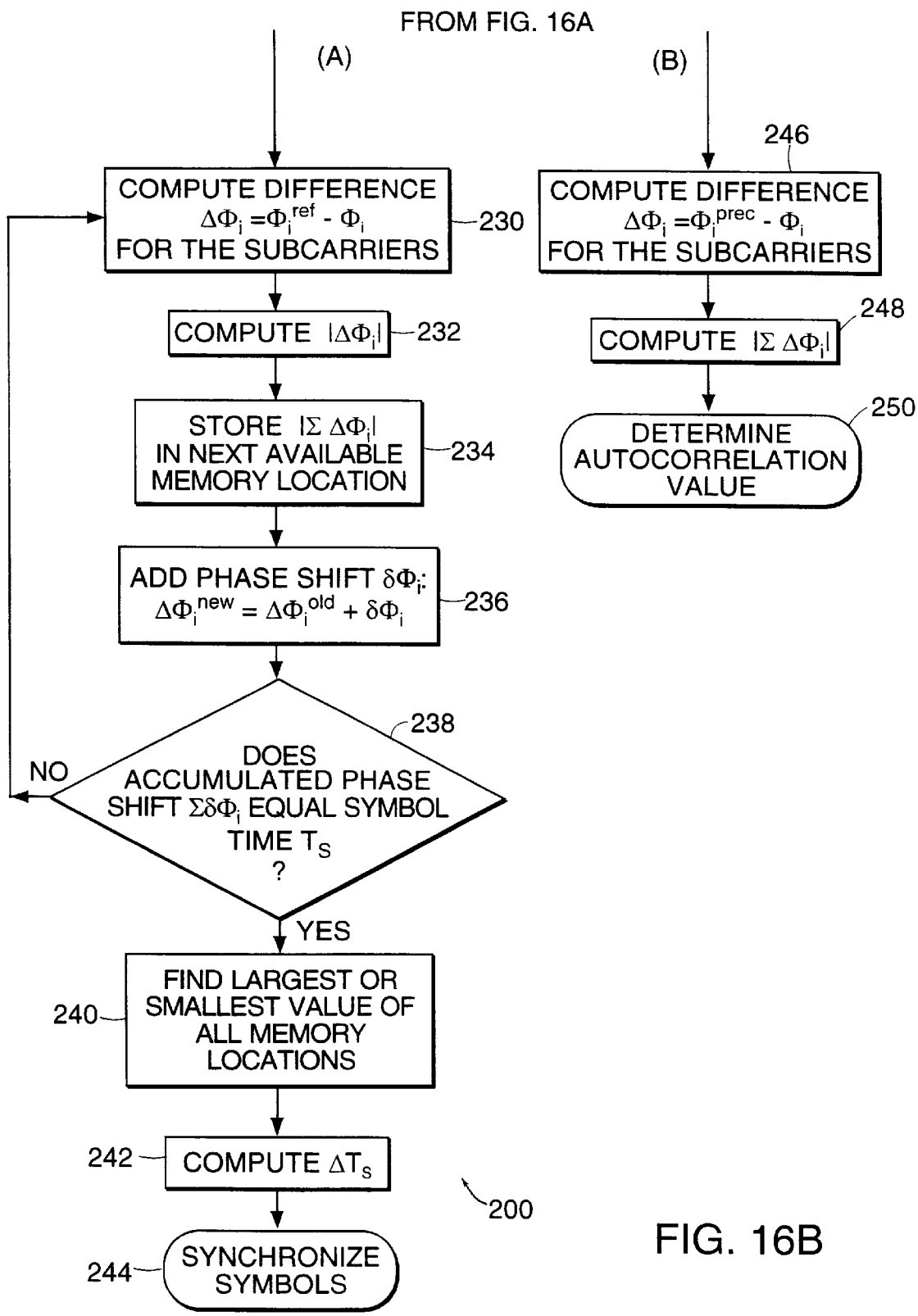

Referring now FIGS. 16A and 16B, in a process 200 for synchronizing OFDM symbols with a reference, a received temporal symbol waveform is sampled at a number (s) of sample points, e.g., s=256 sample points, during the symbol time $T_s$, step 210. The received symbol waveform is processed by applying a window function which can be a rectangular window or an apodizing window function, e.g., a Hanning window, step 212 and The processed waveform is then Fourier-transformed, step 214. Alternatively, the window function 212' can be applied following the Fourier transform 214'. The frequency coordinates are converted to polar coordinates, step 216, to obtain the amplitudes $A_i$ and, more particularly, the phases $\Phi_i$ of the symbol waveform at the OFDM subcarrier frequencies $f_i$. The phases $\Phi_i$ may be stored in a memory for subsequent autocorrelation of the received symbols, step 218.

To synchronize the received phases with a reference, step 220, the phase shift constants $\delta\Phi_i$ at each subcarrier frequency $f_i$ are fetched from memory, step 226. The difference $\Delta\Phi_i = \Phi_i^{ref} - \Phi_i$ is computed at the frequencies $f_i$, step 230. The absolute values $|\Delta\Phi_i|$ are computed, step 232, and summed over all frequencies to form sum $\Sigma|\Delta\Phi_i|$. The sum $\Sigma|\Delta\Phi_i|$ is stored as a correlator output value in the next available output memory location, step 234. A predetermined frequency-dependent phase shift $\delta\Phi_i$ is then added to each difference $\Delta\Phi_i$ to form a new phase differences $\Delta\Phi_i^{new} = \Delta\Phi_i^{old} + \delta\Phi_i$, step 236. If the accumulated phase shift, i.e., the sum $\Sigma(\delta\Phi_i)$, corresponds to a time shift that is essentially equal to the the symbol time $T_s$, step 238, then the process determines a largest or smallest value of the values stored in the memory locations 169 (FIG. 15) and computes a corresponding time shift $\Delta T_s$ of the symbol relative to reference to synchronize the received symbols, step 244. If the accumulated phase shift is less than the symbol time $T_s$, then the process returns from step 238 to step 230 and new differences $\Delta\Phi_i^{new} = \Delta\Phi^{old} + \delta\Phi_i$ are computed.

To determine an autocorrelation value, step 220, the phases $\Phi_i^{prec}$ of a symbol preceding the respective received symbol are fetched from memory, step 224, to compute the difference $\Delta\Phi_i = \Phi_i^{prec} - \Phi_i$. The sum $\Sigma|\Delta\Phi_i|$ over the frequencies $f_i$ is formed, step 248, which represents the autocorrelation value, step 250.

With the phase correlator of the invention, only a single FFT operation is required for each received OFDM symbol. Moreover, the phase correlator 157 advantageously performs only additions and can readily be implemented in hardware with a reasonable number of gates, with the number depending on the number of subcarriers and waveform sample points. The phase correlator does not require expensive hardware and is extremely fast and it shares the same FFT processor implemented for OFDM modulation and demodulation. The number of computations is proportional to the number of subcarrier frequencies. The computation of the phase angles is also independent of the amplitudes $A_i$ so that phase correlation can be performed before automatic gain control (AGC).

It is to be understood that the embodiments and variations shown and described above are illustrative of the principles of this invention only and that various modifications may be implemented by those skilled in the art without departing from the scope and spirit of the invention.

I claim:

1. A method for determining a temporal alignment between a first symbol transmitted via a plurality of orthogonal transmission channels and a reference, the method comprising the steps of:

determining phases of the first symbol for the orthogonal transmission channels;

comparing the phases of the first symbol with phases of the reference to determine a correlation between the phases of the first symbol and the phases of the reference;

displacing the phases of the first symbol relative to the phases of the reference by a phase displacement and repeating the comparing;

choosing a phase displacement based on the correlation between the phases of the first symbol and the phases of the reference; and determining the temporal alignment from the chosen phase displacement.

2. An electrical circuit for determining a temporal alignment between a first symbol transmitted via a plurality of orthogonal transmission channels and a reference, the circuit comprising:

means for determining phases of the first symbol for the orthogonal transmission channels;

means for comparing the phases of the first symbol with phases of the reference to determine a correlation between the phases of the first symbol and the phases of the reference;

means for displacing the phases of the first symbol relative to the phases of the reference by a phase displacement and repeating the comparing;

means for choosing a phase displacement based on the correlation between the phases of the first symbol and the phases of the reference; and means for determining the temporal alignment from the chosen phase displacement.

3. The subject matter of claim 1 or 2, wherein determining the phases includes determining the spectral content of the first symbol.

4. The subject matter of claim 3, wherein determining the spectral content comprises performing a Fourier-transform.

5. The subject matter of claim 1 or 2, wherein the phase displacement depends on the frequency of the transmission channel.

6. The subject matter of claim 5, wherein the phase displacement is proportional to the frequency of the transmission channel.

7. The subject matter of claim 1 or 2, wherein the plurality of channels are OFDM subcarriers.

8. The subject matter of claim 1 or 2, wherein the reference phases are stored in a memory.

9. The subject matter of claim 1 or 2, wherein the reference phases are phases of a symbol that was received before the first symbol is received.

10. The subject matter of claim 1 or 2, wherein transmission channels exhibiting excessive noise or interference are excluded from the phase comparison.

11. The subject matter of claim 1 or 2, wherein obtaining the correlation result comprises computing for the orthogonal channels absolute differences between the first symbol phases and the corresponding reference phases and adding the absolute differences.

12. The subject matter of claim 1 or 2, wherein the temporal alignment determined for the first symbol is used to synchronize at least one symbol following the first symbol.

13. The subject matter of claim 1 or 2, wherein determining the phases of the first symbol comprises applying a window function to at least one of the first symbol and the reference.

14. The subject matter of claim 13, wherein the window function is a rectangular window.

15. The subject matter of claim 13, wherein the window function is an apodizing window function.

16. The subject matter of claim 13, wherein the window function is selected from the group consisting of Gaussian, Hanning, Hamming, Blackman and Kaiser-Bessel windows.

17. The subject matter of claim 3, wherein an apodizing window function is applied to the first symbol before the spectral content of the first symbol is determined.

18. The subject matter of claim 3, wherein an apodizing window function is applied to the first symbol after the spectral content of the first symbol is determined.

19. The subject matter of claim 1 or 2, wherein the temporal alignment corresponds to the phase displacement at which the correlation between the phases of the first symbol and the phases of the reference are a maximum.

* * * * *